(12) United States Patent
Kendrick et al.

(10) Patent No.: US 11,167,520 B2
(45) Date of Patent: Nov. 9, 2021

(54) COMPOSITE CORE WITH NON-TRADITIONAL GEOMETRIES

(71) Applicant: TEXTRON INNOVATIONS INC., Providence, RI (US)

(72) Inventors: Phillip Kendrick, Fort Worth, TX (US); Levi Armstrong, Kerrville, TX (US); Paul K. Oldroyd, Azle, TX (US); Dave Carlson, North Richland Hills, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 43 days.

(21) Appl. No.: 16/367,421

(22) Filed: Mar. 28, 2019

(65) Prior Publication Data
US 2019/0217570 A1 Jul. 18, 2019

Related U.S. Application Data

(62) Division of application No. 14/982,243, filed on Dec. 29, 2015, now Pat. No. 10,328,658.

(51) Int. Cl.
*B32B 3/12* (2006.01)
*B32B 37/10* (2006.01)
(Continued)

(52) U.S. Cl.
CPC .................. *B32B 3/12* (2013.01); *B32B 1/08* (2013.01); *B32B 3/06* (2013.01); *B32B 3/28* (2013.01);
(Continued)

(58) Field of Classification Search
CPC .... B32B 1/08; B32B 3/12; B32B 3/20; B32B 3/26; B32B 5/26; B32B 5/12;
(Continued)

(56) References Cited

U.S. PATENT DOCUMENTS 3,903,341 A 9/1975 Gerhold
4,131,706 A 12/1978 Graf
(Continued)

FOREIGN PATENT DOCUMENTS

DE 102005037055 A1 * 2/2007 ............... B32B 3/12

OTHER PUBLICATIONS

Machine translation of cited reference DE102005037055 (Year: 2006).*

*Primary Examiner* — Donald J Loney
(74) *Attorney, Agent, or Firm* — Edwin S. Flores; Daniel J. Chalker; Chalker Flores, LLP

(57) ABSTRACT

A composite core with non-traditional geometries includes multiple elongate tubes arranged in a two-dimensional array. Each tube is made of a composite material. Each tube includes multiple curved sides. Each curved side inwardly curves toward a longitudinal axis passing through a geometric center of the tube to form a valley on an outer surface of the tube. An end of a first curved side connects to an end of a second curved side to form a crest on the outer surface of the tube. At least one crest formed on an outer surface of a first tube in the two-dimensional array contacts at least one valley formed on an outer surface of an adjacent second tube in the two-dimensional array.

16 Claims, 8 Drawing Sheets

(51) Int. Cl.
    *B32B 37/06*     (2006.01)
    *B32B 3/30*     (2006.01)
    *B32B 5/02*     (2006.01)
    *B32B 5/12*     (2006.01)
    *B32B 5/26*     (2006.01)
    *B32B 1/08*     (2006.01)
    *B32B 3/06*     (2006.01)
    *B32B 3/28*     (2006.01)
    *B21D 15/02*     (2006.01)
    *B32B 3/20*     (2006.01)
    *B32B 3/10*     (2006.01)

(52) U.S. Cl.
    CPC ............... *B32B 3/30* (2013.01); *B32B 5/022* (2013.01); *B32B 5/024* (2013.01); *B32B 5/12* (2013.01); *B32B 5/26* (2013.01); *B32B 37/06* (2013.01); *B32B 37/10* (2013.01); *B21D 15/02* (2013.01); *B32B 3/10* (2013.01); *B32B 3/20* (2013.01); *B32B 2250/20* (2013.01); *B32B 2260/023* (2013.01); *B32B 2260/046* (2013.01); *B32B 2262/0269* (2013.01); *B32B 2262/101* (2013.01); *B32B 2262/106* (2013.01); *B32B 2262/14* (2013.01); *B32B 2307/50* (2013.01); *B32B 2307/54* (2013.01); *B32B 2307/542* (2013.01); *B32B 2605/00* (2013.01); *B32B 2605/18* (2013.01); *Y02B 10/30* (2013.01); *Y10T 428/139* (2015.01); *Y10T 428/1334* (2015.01); *Y10T 428/234* (2015.01); *Y10T 428/236* (2015.01); *Y10T 428/24149* (2015.01); *Y10T 428/24661* (2015.01); *Y10T 428/24744* (2015.01)

(58) Field of Classification Search
    CPC ...... B32B 2262/106; B32B 2262/0269; B32B 2260/023; B32B 2260/046; B32B 2250/20; Y10T 428/234; Y10T 428/236; Y10T 428/24149; Y10T 428/1334; Y10T 428/24744; Y10T 428/24661
    See application file for complete search history.

(56) References Cited

U.S. PATENT DOCUMENTS

| | | |
|---|---|---|
| 5,283,099 A | 2/1994 | Smith et al. |
| 5,567,500 A | 10/1996 | Marshall et al. |
| 8,142,874 B1 | 3/2012 | Jefferson et al. |
| 2007/0065631 A1 | 3/2007 | Sugiura et al. |
| 2010/0102592 A1* | 4/2010 | Tyan ..................... B62D 21/15 296/187.09 |
| 2017/0182730 A1 | 6/2017 | Kendrick et al. |

\* cited by examiner

COMPOSITE CORE WITH NON-TRADITIONAL GEOMETRIES

CROSS-REFERENCE TO RELATED APPLICATIONS

This application claims priority to and is a divisional patent application of U.S. patent application Ser. No. 14/982,243 filed on Dec. 29, 2015, which is hereby incorporated by reference in its entirety.

TECHNICAL FIELD

This disclosure relates to systems and methods to manufacture composite core.

BACKGROUND

A composite structure, such as a composite honeycomb core, can be conventionally manufactured using a manual process of creating a corrugated pattern in multiple composite layers by pressing mandrels against the composite layers. For example, the method described in U.S. Pat. No. 5,567,500 utilizes such a process. The geometry of adjacent composite layers collectively form the cells of the honeycomb core. Such a process is labor intensive which can make the honeycomb core product very expensive. Further, this manufacturing method can result in honeycomb core that is not optimal for various structural implementations.

SUMMARY

This disclosure describes systems and methods to manufacture composite core with non-traditional geometries. Non-traditional geometries are distinguishable from traditional geometries, for example, regular polygons such as hexagons, squares, or other traditional geometries.

In some aspects, a composite core includes multiple elongate tubes arranged in a two-dimensional array. Each tube is made of a composite material. Each tube includes multiple curved sides. Each curved side inwardly curves toward a longitudinal axis passing through a geometric center of the tube to form a valley on an outer surface of the tube. An end of a first curved side connects to an end of a second curved side to form a crest on the outer surface of the tube. At least one crest formed on an outer surface of a first tube in the two-dimensional array contacts at least one valley formed on an outer surface of an adjacent second tube in the two-dimensional array.

This, and other aspects, can include one or more of the following features. The multiple curved sides can include six sides. A first crest formed on the outer surface of the first tube can contact a first valley formed on the outer surface of the second tube. A first valley formed on the outer surface of the first tube can contact a first crest formed on the outer surface of the second tube. A third crest formed on the outer surface of the first tube can contact a first valley formed on an outer surface of an adjacent third tube. A second valley formed on an outer surface of the second tube can contact a first crest formed on an outer surface of the third tube. The first crest formed on the outer surface of the first tube and the first valley formed on the outer surface of the first tube can share an end of a curved side of the first tube. A subset of the multiple elongate tubes in the two-dimensional array can be arranged in a planetary configuration with a central tube surrounded by multiple planet tubes. The central tube and each planet tube can include six crests and six valleys. Each crest of the central tube can contact a respective valley of each planet tube. Each valley of the central tube can contact a respective crest of each planet tube. At least one crest of each planet tube can contact at least one valley of at least one other planet tube. Each tube can include multiple reinforcement fibers disposed in a polymeric matrix. The reinforcement fibers can include at least one or more of carbon, graphite, glass, an aromatic polyamide material or a variant of the aromatic polyamide material. The polymeric matrix can include a resin. The resin can be a thermoplastic resin or a thermosetting resin. The multiple reinforcement fibers can be oriented in one or more directions. The multiple reinforcement fibers can be arranged in layers along a radius of each tube.

Some aspects of the subject matter described here can be implemented as a method of manufacturing a composite core. Each of multiple mandrels is wrapped in a mandrel wrapping process that includes securing each mandrel with a winding jig, orienting composite material at a wrap angle to each mandrel, and depositing the composite material around an outer surface of each mandrel. Each mandrel includes multiple curved sides. Each curved side inwardly curves toward a longitudinal axis passing through a geometric center of the mandrel to form a valley on the outer surface of the mandrel. An end of a first curved side connects to an end of a second curved side to form a crest on the outer surface of the mandrel. The multiple wrapped mandrels are assembled in a two-dimensional array in a tool. At least one crest formed on an outer surface of a first mandrel in the two-dimensional array contacts at least one valley formed an outer surface of an adjacent second mandrel in the two-dimensional array. A pressure is applied to the composite material wrapped around the multiple mandrels in a curing cycle.

This, and other aspects, can include one or more of the following features. Applying the pressure to the composite material wrapped around the multiple mandrels in the curing cycle can include wrapping a bladder around the tool, and inflating the bladder in the curing cycle. An amount of pressure in the bladder and a duration of pressure application in the curing cycle can be controlled. Applying the pressure to the composite material wrapped around the multiple mandrels in the curing cycle can include heating the multiple mandrels to thermally expand the multiple mandrels.

In some aspects, a composite core includes multiple elongate hollow tubes arranged in a two-dimensional array. Each hollow tube is made of a composite material. Each tube includes comprising a cross-section comprising twelve longitudinal sides. A first end of a first side is connected to a first end of a second side at an internal angle that is less than 90 degrees. A second end of the first side is connected to a first end of a third side at an internal angle that is greater than 90 degrees and less than 180 degrees. A second end of the third side is connected to a first end of a fourth side at an internal angle that is greater than 180 degrees.

This, and other aspects, can include one or more of the following features. A second end of the fourth side is connected to a first end of a fifth side at an internal angle that is greater than 90 degrees and less than 180 degrees. A second end of the fifth side is connected to a first end of a sixth side at an internal angle that is less than 90 degrees. A second end of the sixth side is connected to a first end of the seventh side at an internal angle that is greater than 90 degrees and less than 180 degrees. A second end of the seventh side is connected to a first end of an eighth side at an internal angle that is greater than 180 degrees. A second end of the eighth side is connected to a first end of the ninth side at an internal angle that is greater than 90 degrees and less than 180 degrees. A second end of the tenth side is connected to a first end of an eleventh side at an internal angle that is greater than 90 degrees and less than 180 degrees. A second end of the eleventh side is connected to a first end of the twelfth side at an internal angle that is greater than 180 degrees. A second end of the twelfth side is connected to a second end of the second side at an internal angle that is less than 90 degrees. The twelve sides are of substantially equal length. The cross-section of each hollow tube includes a first set of three joints. Each joint in the first set is formed by a side connecting to an adjacent side at an internal angle that is less than 90 degrees. Each joint in the first set protrudes outwards away from a longitudinal axis of each hollow tube. The cross-section of each hollow tube includes a second set of three joints. Each joint in the second set is formed by a side connecting to an adjacent side at an internal angle that is greater than 180 degrees. Each joint in the second set protrudes inwards towards the longitudinal axis of each hollow tube. The multiple tubes include a first tube and a second tube. Outer surfaces of two sides forming a joint in the first set of joints in the first tube contacts outer surfaces of two sides forming a joint in the second set of joints in the second tube. The multiple tubes include a first tube, a second tube and a third tube. A joint in the first set of joints of the first tube contacts a joint in the second set of joints of the second tube, a joint in the first set of joints of the second tube contacts a joint in the second set of joints of the third tube, and a joint in the first set of joints of the third tube contacts a joint in the second set of joints of the first tube. The core includes a tube of hexagonal cross-section. Two sides of the tube of hexagonal cross-section are aligned with two sides of at least one tube of the plurality of tubes. Each tube includes multiple reinforcement fibers disposed in a polymeric matrix. The reinforcement fibers include at least one or more of carbon, graphite, glass, an aromatic polyamide material or a variant of the aromatic polyamide material. The polymeric matrix includes a resin. The resin can be a thermoplastic resin or a thermosetting resin. The multiple reinforcement fibers can be oriented in one or more directions. The multiple reinforcement fibers can be oriented in one or more directions.

Some aspects of the subject matter described here can be implemented as a method of manufacturing a composite core. Each of multiple mandrels is wrapped in a mandrel wrapping process that includes securing each mandrel with a winding jig, orienting composite material at a wrap angle to each mandrel, and depositing the composite material around an outer surface of each mandrel. Each mandrel includes multiple elongate tubes arranged in a two-dimensional array. Each tube assembly includes a cross-section including twelve longitudinal sides. A first end of a first side is connected to a first end of a second side at an internal angle that is less than 90 degrees. A second end of the first side is connected to a first end of a third side at an internal angle that is greater than 90 degrees and less than 180 degrees. A second end of the third side is connected to a first end of a fourth side at an internal angle that is greater than 180 degrees. The multiple wrapped mandrels are assembled in a two-dimensional array in a tool. A pressure is applied to the composite material wrapped around the multiple mandrels in a curing cycle.

This, and other aspects, can include one or more of the following features. A second end of the fourth side is connected to a first end of a fifth side at an internal angle that is greater than 90 degrees and less than 180 degrees. A second end of the fifth side is connected to a first end of a sixth side at an internal angle that is less than 90 degrees. A second end of the sixth side is connected to a first end of the seventh side at an internal angle that is greater than 90 degrees and less than 180 degrees. A second end of the seventh side is connected to a first end of an eighth side at an internal angle that is greater than 180 degrees. A second end of the eighth side is connected to a first end of the ninth side at an internal angle that is greater than 90 degrees and less than 180 degrees. A second end of the ninth side is connected to a first end of a tenth side at an internal angle that is less than 90 degrees. A second end of the tenth side is connected to a first end of an eleventh side at an internal angle that is greater than 90 degrees and less than 180 degrees. A second end of the eleventh side is connected to a first end of the twelfth side at an internal angle that is greater than 180 degrees. A second end of the twelfth side is connected to a second end of the second side at an internal angle that is less than 90 degrees. Applying the pressure to the composite material wrapped around the multiple mandrels in the curing cycle can include wrapping a bladder around the tool, and inflating the bladder in the curing cycle. An amount of pressure in the bladder and a duration of pressure application in the curing cycle can be controlled. Applying the pressure to the composite material wrapped around the multiple mandrels in the curing cycle can include heating the multiple mandrels to thermally expand the multiple mandrels.

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

Figure 1:
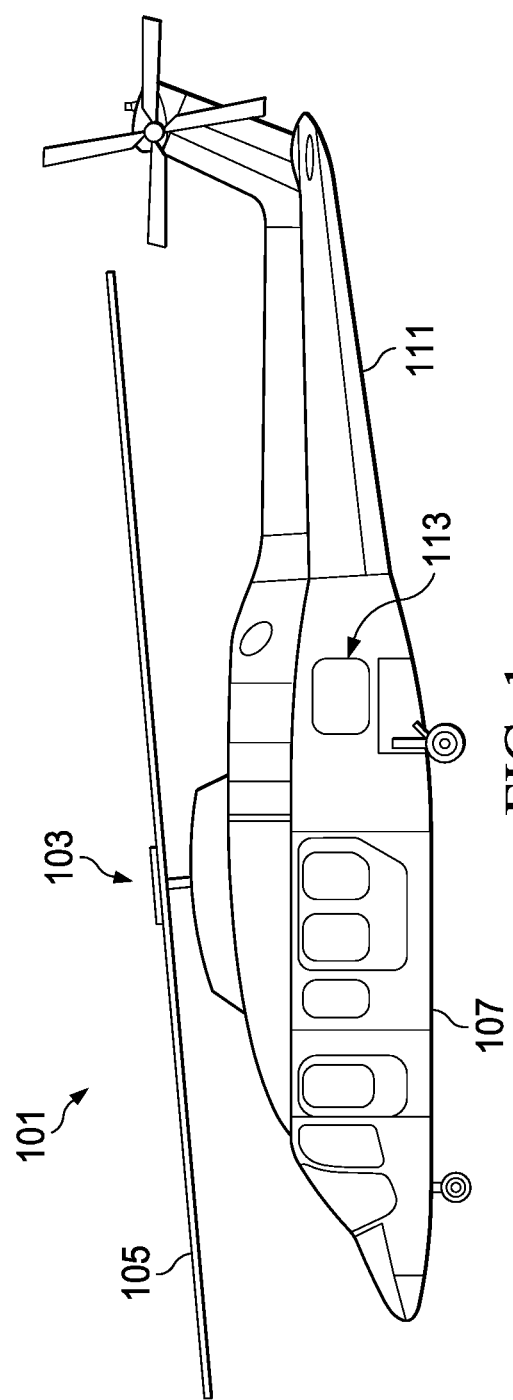
FIG. 1 is a side view of an example of a rotorcraft.

FIG. 1 is a side view of an example of a rotorcraft 101. Rotorcraft 101 has a rotor system 103 with multiple rotor blades 105. The pitch of each rotor blade 105 can be managed to selectively control direction, thrust, and lift of rotorcraft 101. Rotorcraft 101 can further include a fuselage 107, anti-torque system 109, and an empennage 111. Rotorcrafts other than rotorcraft 101 and other vehicles or objects (or both) can utilize the composite core manufactured by the systems and methods described here. Such vehicles or objects can include, for example, wind turbine blades, sea-based vehicles, radomes, enclosures, shelters, bridge decks, building facades, ground vehicles, rail vehicles, air vehicles, space vehicles, and manned or un-manned vehicles, to name a few.

Figure 2:
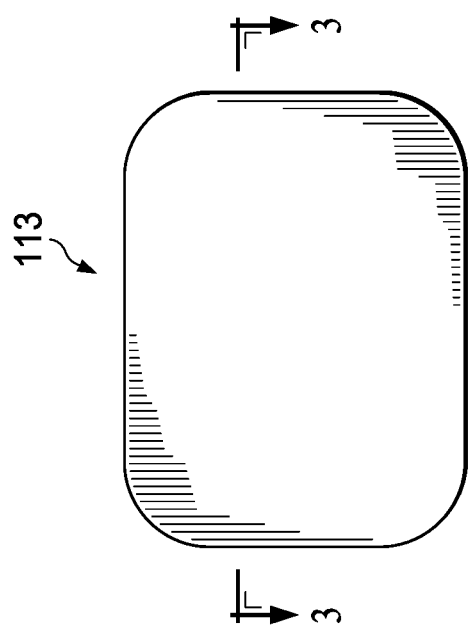
FIG. 2 is a side view of an example of a panel.
Figure 3:
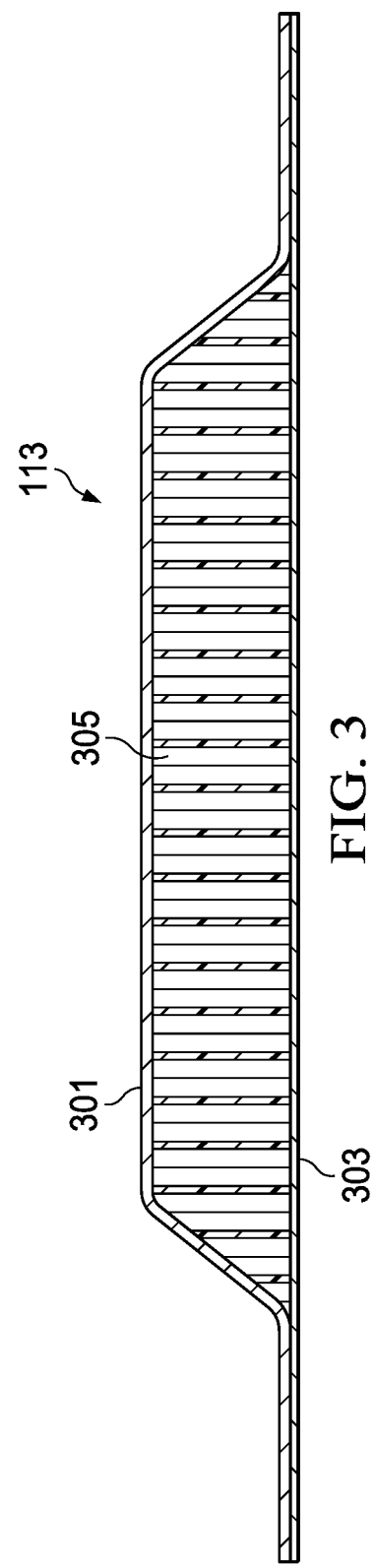
FIG. 3 is a cross-sectional view of the panel, taken from section lines 3-3 in FIG. 2.

FIG. 2 is a side view of an example of a panel 113 on the rotorcraft 101. FIG. 3 is a cross-sectional view of the panel, taken from section lines 3-3 in FIG. 2. The panel 101 is illustrative of a wide variety of structures that can include a core member configured as a lightweight means of generating strength and stiffness in the structure. Panel 113 is a composite assembly that can include an upper skin 301, a lower skin 303, and a composite core 305. Composite core 305 can be adhesively bonded to upper skin 301 and lower skin 303. The panel 113 can take on a wide variety of contours and configurations.

For example, composite core 305, having implementation-specific geometry, can be carved from another composite core, for example, the composite cores described below with reference to FIGS. 4 and 5 or FIGS. 6 and 7. Alternatively or in addition, the composite core 305 can be manufactured in a net shape using the methods described below such that a subsequent carving procedure is not required. The composite core can be manufactured using a wide variety of materials and cell sizes. For example, the composite core can be made from a carbon fiber and resin composite system.

As described below, the composite core such as those described below can include multiple elongate tubes. Each tube of the composite core can include multiple reinforcement fibers disposed in a polymeric matrix. For example, each tube can include fibers made from one or more of carbon, graphite, glass, an aromatic polyamide (i.e., "aramid") material, a variant of an aromatic polyamide material (e.g., a polyparaphenylene terephthalamide material, such as KEVLAR® by E. I. du Pont de Nemours and Company of Richmond, Va.), combinations of them, or the like. The scope of the present disclosure, however, encompasses fibers comprising any suitable material or combination of materials. The polymeric matrix can include any suitable resin system, such as a thermoplastic or thermosetting resin, for example. Exemplary resins include epoxy, polyimide, polyamide, bismaleimide, polyester, vinyl ester, phenolic, polyetheretherketone (PEEK), polyetherketone (PEK), polyphenylene sulfide (PPS), and the like.

The fibers of tubes can be oriented in one or more directions and can be woven or unwoven. It should be appreciated that one or more tubes can alternatively only include fibers arranged in a single direction, such as uniaxial or helical fiber configurations. In some implementations, the reinforcement fibers can be arranged in layers along a radius of each tube. For example, a first ply can include fibers and a second ply can include fibers, such that the second ply is laid-up over the first ply.

Figure 4:
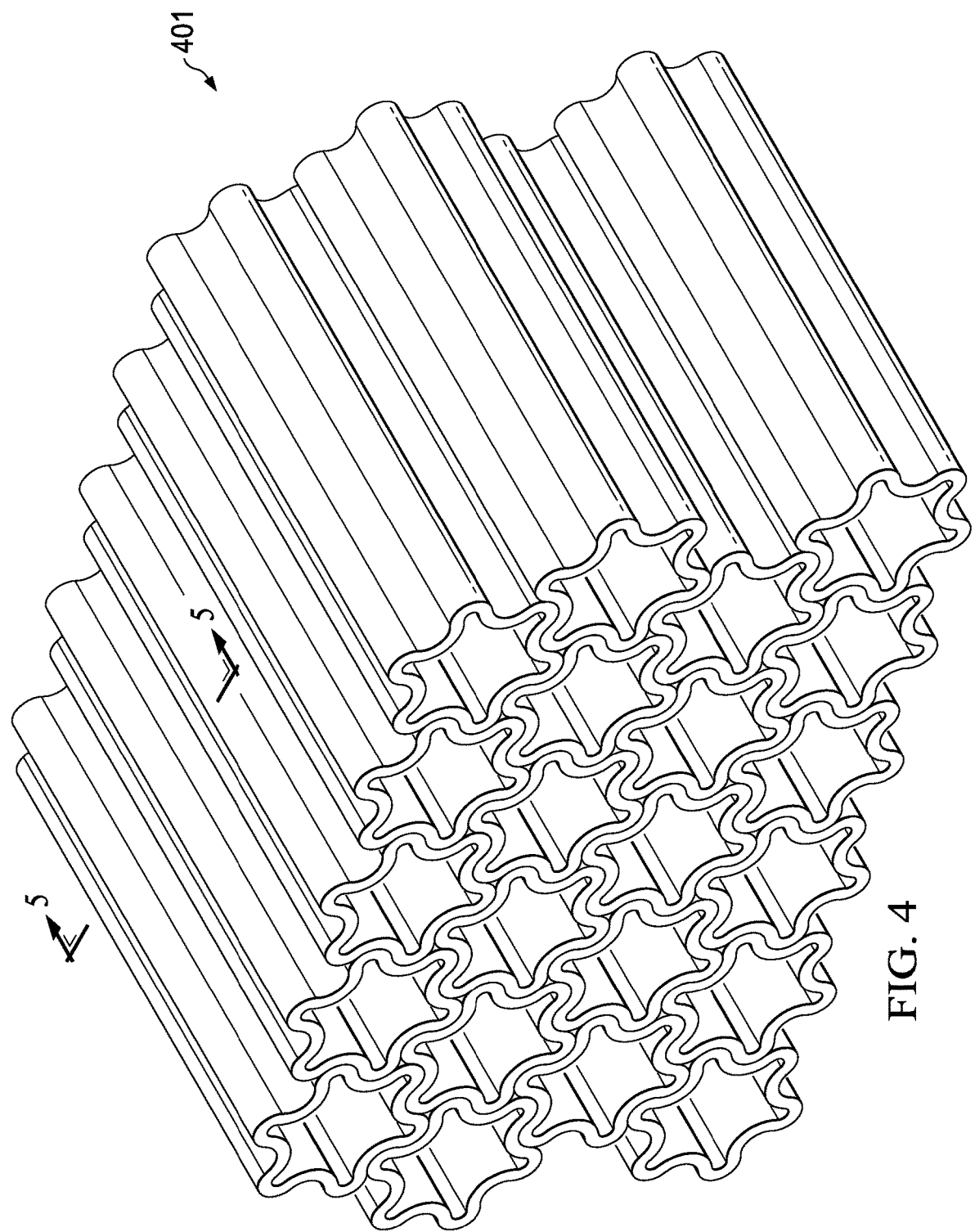
FIG. 4 is a perspective view of a first example of a composite core having a non-traditional geometry.
Figure 5:
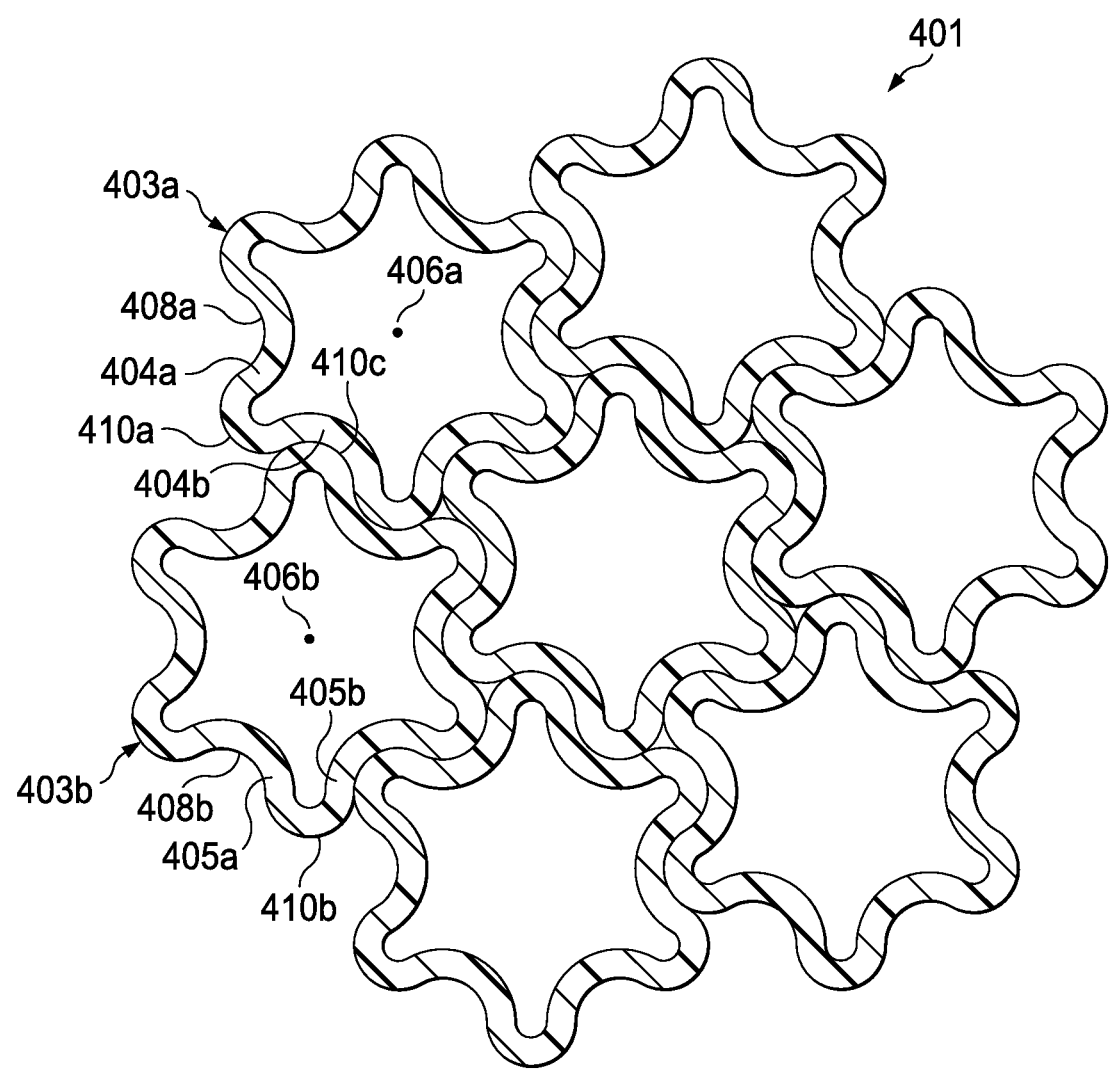
FIG. 5 is a cross-sectional view of the first example of the composite core.

FIG. 4 is a perspective view of a first example of a composite core 401 having a non-traditional geometry. FIG. 5 is a cross-sectional view of the first example of the composite core 401 taken from section lines 5-5 in FIG. 4. In some implementations, the composite core 305 can be manufactured from the composite core 401. Alternatively, the composite core 305 can be manufactured to have the non-traditional geometry described with reference to FIGS. 4 and 5. The composite core 401 can have the composite core features described above.

In some implementations, the composite core 401 can include multiple elongate hollow tubes (for example, a first tube 403a, a second tube 403b) arranged in a two-dimensional array. Each tube includes multiple curved sides (for example, sides 404a and 404b in the first tube 403a, sides 405a and 405b in the second tube 403b). For example, each tube includes six sides.

Each curved side inwardly curves toward a longitudinal axis passing through a geometric center of the tube (for example, axis 406a of the first tube 403a, axis 406b of the second tube 403b) to form a valley on an outer surface of the tube (for example, valley 408a on the first tube 403a, valley 408b on the second tube 403b). An end of a first curved side connects to an end of a second curved side to form a crest on the outer surface of the tube (for example, crest 410a on the first tube 403a, crests 410b and 410c on the second tube 403b). Thus, a tube with six sides includes six crests and six valleys. A crest and a valley on a tube share an end of a curved side of the tube.

At least one crest formed on an outer surface of a tube in the two-dimensional array contacts at least one valley formed on an outer surface of an adjacent second tube in the two-dimensional array. For example, the crest 410c in the second tube 403b contacts the valley 408b in the first tube 403a. In this manner, multiple crests and valleys on each elongate tube in the array can contact multiple crests and valleys on each adjacent tube resulting in a planetary arrangement of tubes in which a central tube is surrounded by and interlocked with six other tubes. The composite core 401 can include multiple such planetary arrangements, each including a central tube and six planet tubes surrounding the central tube. The central tube in the planetary arrangement can include six crests, each of which contacts a respective valley of a planet tube that surrounds the central tube. The central tube also includes six valleys, each of which contacts a respective crest of the planet tube that surrounds the central tube. In addition, at least one crest of each planet tube contacts at least one valley of at least one other planet tube.

The interlocking between adjacent tubes can increase a stiffness and consequently strength of the composite core 401 when compared to tubes having, for example, a hexagonal cross-section. Such a composite core 401 can be designed for one or more of different loads such as compression, tension, shear, or other loading scenarios, particularly for core panels that are not flat. Such a composite core 401 can be used in applications in which a combination of loads is applied across a surface. Such interlocking geometries can help to stabilize the core during machining, prior to face-sheet assembly. As a mill, router, or other rotating cutting implement contacts the core, it will have a tendency to twist or "wrap". The increased surface area contact with adjacent cells can help to mitigate this deformation, and improve the accuracy of the cut. The increased surface area also increases adhesive bond line length at the face sheet.

Figure 6:
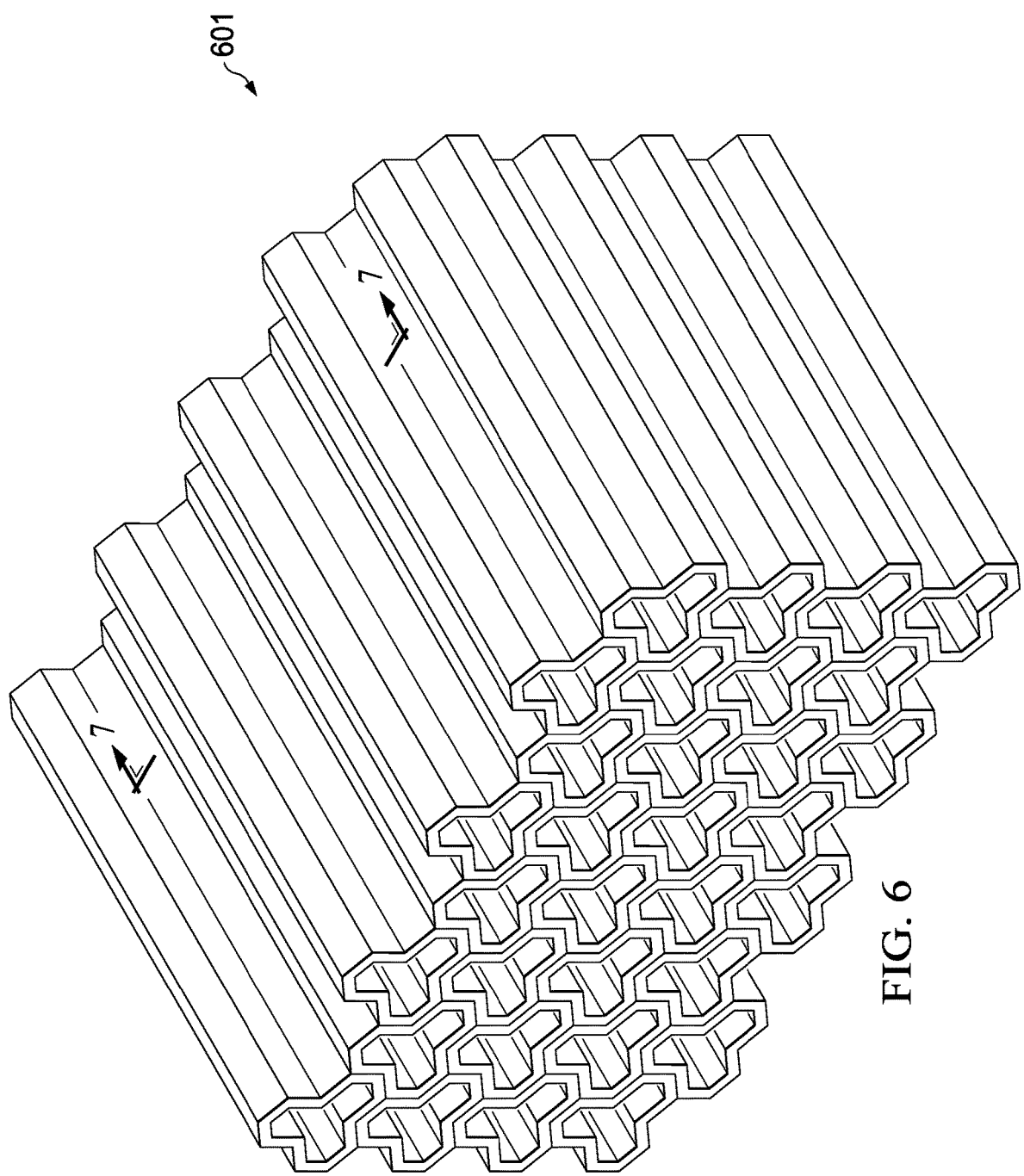
FIG. 6 is a perspective view of a second example of a composite core having a non-traditional geometry.
Figure 7:
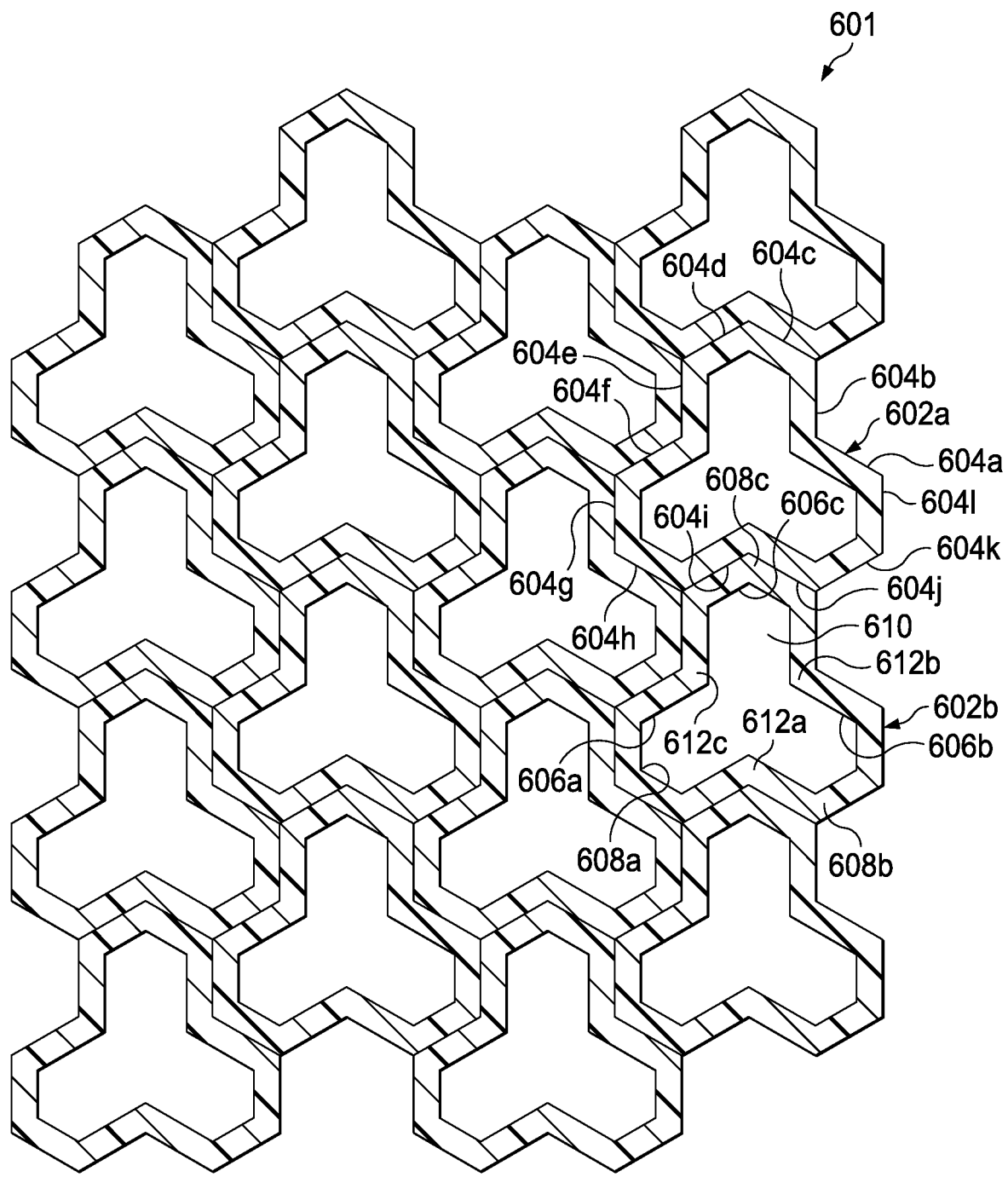
FIG. 7 is a cross-sectional view of the second example of the composite core.

FIG. 6 is a perspective view of a second example of a composite core 601 having a non-traditional geometry. FIG. 7 is a cross-sectional view of the second example of the composite core 601 taken from section lines 7-7 in FIG. 6. In some implementations, the composite core 305 can be manufactured from the composite core 601. Alternatively, the composite core 305 can be manufactured to have the non-traditional geometry described with reference to FIGS. 6 and 7. The composite core 601 can have the composite core features described above.

In some implementations, the composite core 601 can include multiple elongate hollow tubes (for example, a first tube 602a, a second tube 602b) arranged in a two-dimensional array. Each tube includes a cross-section having twelve longitudinal sides (for example, sides 604a-604l). A first end of a first side is connected to a first end of a second side at an internal angle 606a that is less than 90 degrees. A second end of the first side is connected to a first end of a third side at an internal angle 606b that is greater than 90 degrees and less than 180 degrees. A second end of the third side is connected to a first end of a fourth side at an internal angle 606c that is greater than 180 degrees.

This sequence is repeated until an end of the twelfth side is connected to the second end of the first side. For example, a second end of the fourth side is connected to a first end of a fifth side at an internal angle that is greater than 90 degrees and less than 180 degrees. A second end of the fifth side is connected to a first end of a sixth side at an internal angle that is less than 90 degrees. A second end of the sixth side is connected to a first end of the seventh side at an internal angle that is greater than 90 degrees and less than 180 degrees. A second end of the seventh side is connected to a first end of an eighth side at an internal angle that is greater than 180 degrees. A second end of the eighth side is connected to a first end of the ninth side at an internal angle that is greater than 90 degrees and less than 180 degrees. A second end of the ninth side is connected to a first end of a tenth side at an internal angle that is less than 90 degrees. A second end of the tenth side is connected to a first end of an eleventh side at an internal angle that is greater than 90 degrees and less than 180 degrees. A second end of the eleventh side is connected to a first end of the twelfth side at an internal angle that is greater than 180 degrees. The second end of the twelfth side is connected to a second end of the second side at an internal angle that is less than 90 degrees.

The twelve sides are substantially straight and of substantially equal length. Each tube in the two-dimensional array is formed as described above. The connection of the joints results, for each tube, in two sets of joints, each set including three joints. Each joint in the first set (for example, joints 608a, 608b, 608c in tube 602b) is formed by a side connecting to an adjacent side at an internal angle that is less than 90 degrees. Each joint in the first set protrudes away from a longitudinal axis (for example, axis 610) of the tube. Each joint in the second set (for example, joints 612a, 612b, 612c in tube 602b) is formed by a side connecting to an adjacent side at an internal angle that is greater than 180 degrees. Each joint in the second set protrudes towards the longitudinal axis of the tube.

The tubes in the two-dimensional array include the first tube 602a and the second tube 602b. The cross-sectional geometry of each tube defines joints which can be divided into sets as described here. Outer surfaces of two sides forming a joint in the first set of joints in the first tube 602a contacts outer surfaces of two sides forming a joint in the second set of joints in the second tube 602b. In addition, a joint in the first set of joints in the first tube 602a contacts a joint in the second set of joints in the second tube 602b. A joint in the first set of joints of the second tube 602b contacts a joint in the second set of joints on a third tube. A joint in the first set of joints in the third tube contacts a joint in the second set of joints of the first tube 602a.

Figure 8:
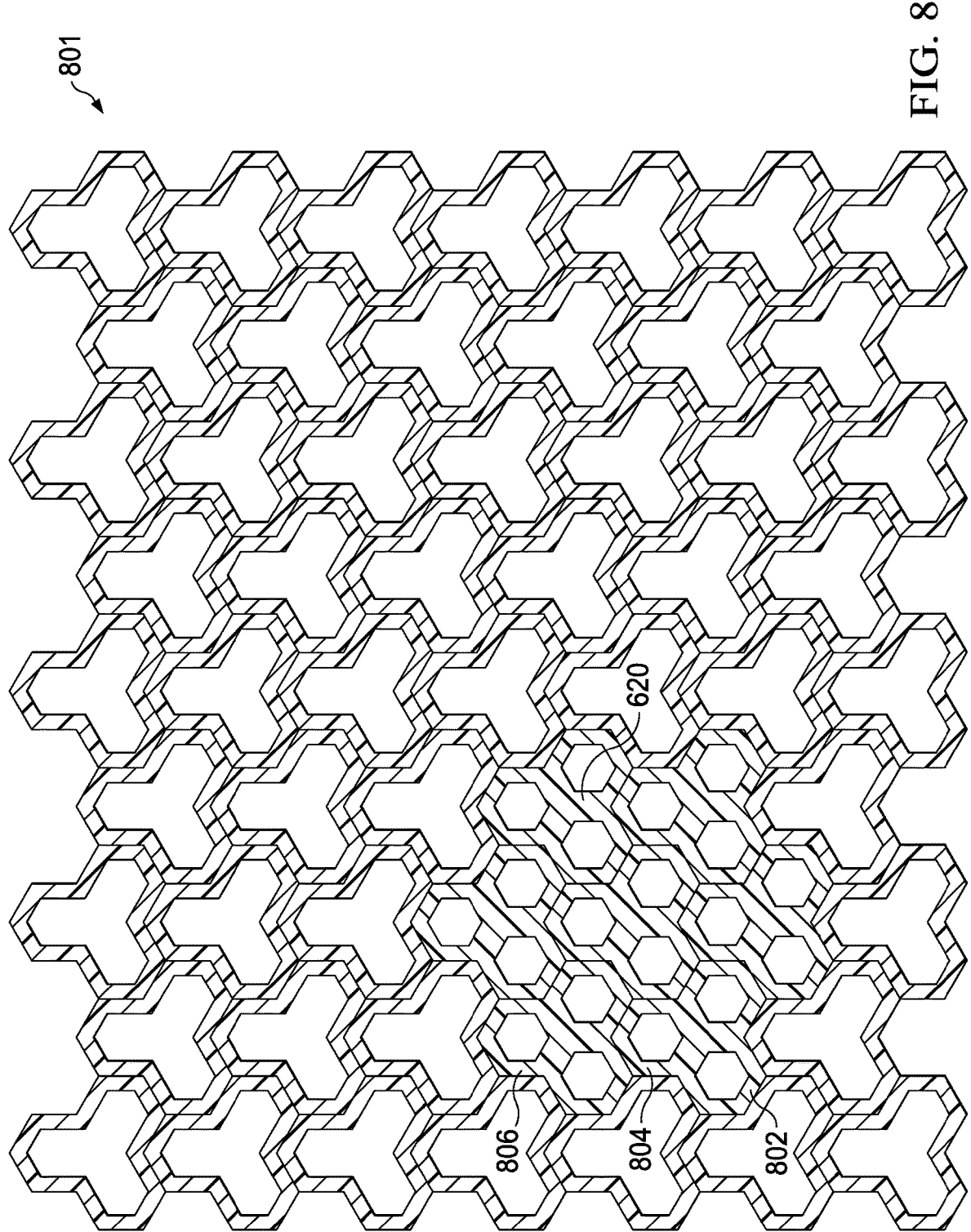
FIG. 8 is a cross-sectional view of a third example of a composite core having traditional and non-traditional geometries.

FIG. 8 is a cross-sectional view of a third example of a composite core 801 having traditional and non-traditional geometries. In some implementations, the composite core 801 can include multiple elongate tubes described above with reference to FIGS. 6 and 7 together with elongate tubes (for example, tubes 620, 802, 804, 806 and more or fewer tubes) having traditional geometries, for example, hexagonal geometries. In some implementations, the combination of traditional and non-traditional geometries can be used to tailor properties of the composite core. For example, in applications in which portions of the composite core require high strength but less weight, elongate tubes with non-traditional geometries can be used. Other portions of the composite core that do not have the same high strength and low weight requirements can be constructed using elongate tubes with traditional geometries.

For example, a traditional, hexagonal geometry can provide increased weight and strength. A non-traditional geometry such as the one shown in FIG. 7 can provide comparatively decreased weight and decreased strength. When combined, the non-traditional geometry can be implemented in "filling" areas of low stress with comparatively less density core to reduce the overall weight of a composite core panel. In some design scenarios, skins can be spaced apart for functional rather than structural reasons (for example, the primary function of the core is to retain spacing of the skins, not transfer substantial load between them). In such scenarios, some areas of a sandwich panel can require high strength in a first area and that the skins be held apart in a second area. That is, the second area may experience a comparatively less load than the first area. In such scenarios, the non-traditional geometry can provide the needed strength using less material to reduce weight, for example, when strength is not critical.

Figure 9:
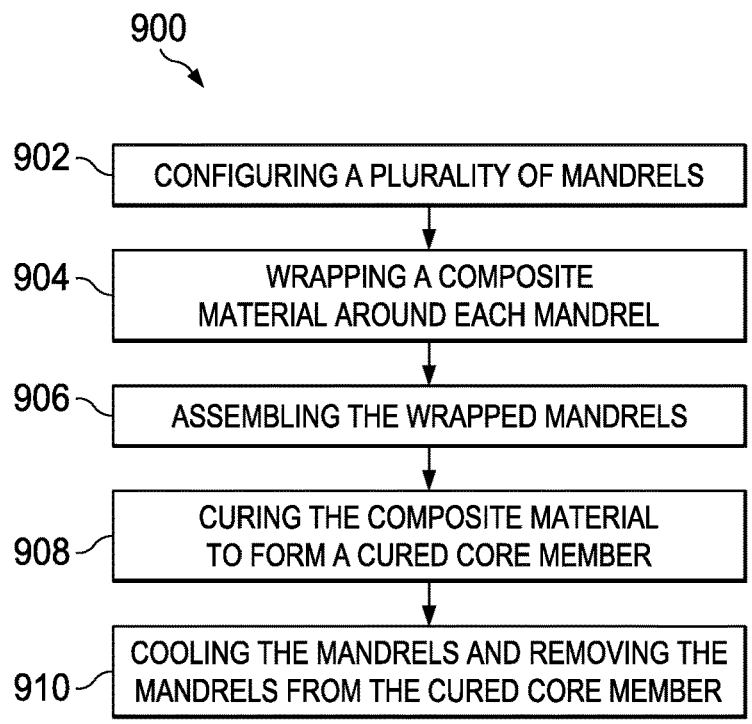
FIG. 9 is a flowchart of an example of a process for manufacturing a composite core.

FIG. 9 is a flowchart of an example of a process 900 for manufacturing a composite core. The process 900 can be implemented to manufacture any composite core including, for example, composite cores having traditional geometries, composite cores having non-traditional geometries such as those described above with reference to FIGS. 4 and 5 or FIGS. 6 and 7, composite cores having a combination of traditional and non-traditional geometries such as those described above with reference to FIG. 8 or any other composite core. At 902, multiple mandrels can be configured. One or more or all of the mandrels can have a traditional geometric cross-section, for example, a hexagonal cross-section, or a non-traditional geometric cross-section, for example, the cross-section described above with reference to FIGS. 4 and 5 or with reference to FIGS. 6 and 7. At 904, a composite material can be wrapped around each mandrel. At 906, the wrapped mandrels can be assembled. At 908, the composite material can be cured to form a cured core member. At 910, the mandrels can be cooled and removed from the cured core member.

A mandrel is metallic and made using, for example, aluminum. The material with which a mandrel is made is chosen to have a relatively low coefficient of thermal expansion (CTE). The mandrel can be cured in a tool that utilizes a bladder (FIG. 10) or other device to apply pressure from the exterior. Alternatively or in addition, the mandrel material can be chosen to have a desired amount of CTE so that curing pressure is derived from a thermal expansion of the mandrels within a confining tool.

A mandrel can be configured with a hollow portion extending through the centerline length of mandrel, forming a body portion between hollow portion and outer surface. The mandrel is configured so that during the curing process of the composite core, the temperature of each mandrel is increased such that body portion volumetrically expands uniformly both in an inward direction and an outward direction, until outer surface is bounded by its nearest neighbor mandrel, at which point the pressure exerted by mandrel on its nearest neighbor mandrel remains relatively constant, and the thermal expansion of body portion continues primarily in an inward direction. The degree of thermal expansion of each mandrel is dependent upon the CTE of the material of each mandrel. The geometry of mandrel can be selected to tailor the physical properties of mandrel and the resultant composite core. Further, the geometry of mandrel can be selected to tailor the strength/stiffness of the mandrel. Further, the wall thickness of body portion, as well as the geometry of hollow portion, can be selectively controlled to produce a desired thermal expansion profile. For example, a mandrel having a smaller hollow portion would provide a higher external pressure than a mandrel with a comparatively larger hollow portion. In some implementations, the hollow portion is cylindrical; however, it should be appreciated that other implementations can have non-cylindrical shapes.

Each mandrel is configured with a hollow portion which allows hot air to be ducted therethrough during the cure cycle. Alternatively, one or more or all of the mandrels need not include a hollow portion. The exterior shape of the mandrels can match the traditional or non-traditional geometries described here.

In some implementations, a Teflon® material, or other bond-resistant material or coating, can be used to prevent the composite material from bonding to the exterior surface of mandrel during the cure cycle. As such, each mandrel can include a layer of the bond-resistant material adjacent to the outer surface of each mandrel.

Referring again to FIG. 9, step 904 includes wrapping composite material around each mandrel, such as mandrel. The exact method of wrapping or otherwise depositing the uncured composite material on the exterior surface of each mandrel is implementation specific. In some implementations, one or more steps of process 900 are performed by an automated system; however, it should be appreciated that any of the steps can be performed manually.

A system for at least partially performing one or more steps of process 900 can include a hopper configured to house multiple mandrels. Each mandrel can be selectively deployed and captured by a winding jig. For example, each mandrel can be released onto a conveyor and picked up by arms of the winding jig. The winding jig can be configured to position and retain each mandrel for the composite material to be deposited on each mandrel. The winding jig can be configured to operably secure each mandrel between couplings that have a geometry similar to that of the mandrel. The couplings can be aligned with the mandrel during the composite material winding process. In general, the winding jig can be any fixture can be used to facilitate the depositing of composite material onto a mandrel.

In some implementations, a filament winding process can be implemented to wrap uncured composite material around each mandrel. A continuous, resin-impregnated fiber extending from a filament winding machine is wound about the mandrel. The resin can be either a thermosetting or thermoplastic resin and becomes the polymeric matrix of each tube upon curing. The material placement process may be conducted in a variety of processes; for example, a mandrel can move axially while a spool of fiber rotates around the mandrel. Alternatively, a spool or multiple spools of material can rotate around a mandrel. As fiber is wound onto the mandrel by the filament winding machine, a pattern defined by the mandrel geometry (for example, a traditional geometry or a non-traditional geometry or a combination of them) is formed. One or more plies of fiber, in desired orientations with respect to the mandrel, are wound onto the mandrel to form the basic geometry of each tube.

The angle at which the fiber is wound about the mandrel can vary along the length of the mandrel to customize the properties of the composite core. For example, the angle of the fiber can be dynamically changed during the material placement process to customize a compressive strength of the core. The mandrel and the one or more plies that have filament wound onto the mandrel are subsequently assembled with other mandrels and plies to form the composite core such as the core described above. Upon cutting plies and the mandrel, the material may have a tendency to unwind. A band of material, potentially adhesive or fibrous, can be used to keep the fiber from unraveling upon cutting of the plies and the mandrel. An adhesive material with unidirectional fibers could be used to band the fiber on the mandrel. Further, the band can be selectively located and used to provide extra support for a subsequent post-processing procedure of the core, such as a machining process.

In some implementations, wrapping uncured composite material around a mandrel is performed using a fiber placement process. A continuous, resin-impregnated tow of approximately, but not limited to, 1000 fibers is applied to a mandrel by a fiber placement machine. The tow may also be portions of a full tow; for example, a half tow of 500 fibers. In lieu of a tow, a tape of fibers, cut to a prescribed width, may be used. The resin can be a thermosetting or thermoplastic resin, to name two examples, and becomes the polymeric matrix of the elongate tube upon curing. During the fiber placement process, the mandrel can move axially while the tow rotates around the mandrel. As the tow is applied to the mandrel by the fiber placement machine, a pattern defined by a mandrel cross-section (for example, a cross-section having the non-traditional or traditional geometry described above) is formed. One or more plies of tow, in desired orientations with respect to the mandrel, are wound onto the mandrel. The mandrel and the one or more plies that have been fiber placed onto the mandrel are subsequently assembled with other mandrels and plies to form the composite core.

In some implementations, the mandrel is wrapped multiple times to produce multiple layers of composite material layers. In such implementations, the fiber orientation, wrap angle, and/or wrapping direction can be varied to produce tailored mechanical and physical properties. In some situations, it may be desirable to provide ventilation and/or drainage in the composite core, such as in a wing member of an aircraft that also functions as a fuel tank. In such an embodiment, step 605 of method 601 can also include creating perforations in the raw material or slit 819. The perforations can be created by any variety of methods; one method can be running the raw material over a spiked wheel or spiked roller support.

Assembling the wrapped mandrels can include assembling and inserting the wrapped mandrels in a tool or other fixture. The exact configuration of the tool is implementation specific. For example, the tool can be configured to produce a core member having a non-traditional geometry, a traditional geometry or a combination of the two as described above. In one example, the multiple mandrels having wrapped composite material are assembled onto partial tool members 1003a-1003f in a pyramid shape automatically or manually. Each partial tool member can include apertures to control and tailor any thermal expansion of the partial tool member during the cure process. In one example, each partial tool member is stacked with seven levels of wrapped mandrels. Upon assembling each partial tool member and their wrapped mandrels, one additional wrapped mandrel is located in the center. However, it should be appreciated that each partial tool member may be stacked with wrapped mandrels and assembled in a variety of ways.

To cure the composite material wrapped around the mandrels to form the cured composite core, in some implementations, the uncured composite material around each mandrel is cured by subjecting the assembly to the requisite temperature and pressure. As discussed above, the temperature and rate of temperature change of the composite material can be controlled in part by blowing hot air through the interior of the mandrels. During the curing process of step 908, the temperature and pressure exerted upon the composite material is implementation specific.

Figure 10:
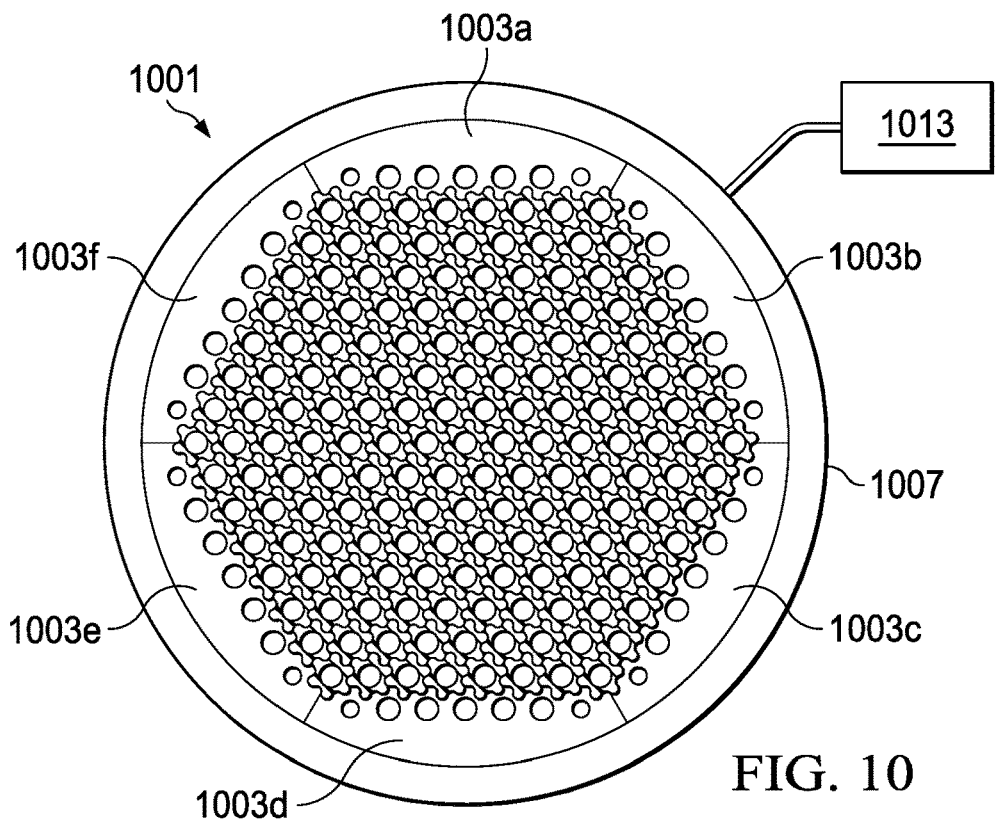
FIG. 10 is an end view of multiple composite-wrapped mandrels assembled in a tool.
Like reference numbers and designations in the various drawings indicate like elements.

FIG. 10 is an end view of multiple composite-wrapped mandrels assembled in a tool 1001. The tool 1001 includes a bladder 1007 that is configured to inflate to provide a prescribed inward pressure upon the assembly of wrapped mandrels. In some implementations, the bladder is configured to inflate to provide a prescribed inward pressure upon the assembly of wrapped mandrels. However, it should be appreciated that the present disclosure contemplates other methods of providing pressure to the composite material wrapped around each mandrel during the curing process, such as mechanical pressure generating devices. In some implementations, curing pressure can be generated by the thermal expansion of the mandrels. In such implementations, the tool can include a rigid constraining structure in lieu of the bladder. The heating of the mandrels causes thermal expansion, which generates pressure at the composite material between the mandrels.

The tool 1001 can include a blower for generating an airflow and evenly distributing the airflow through the interiors of the multiple mandrels. Alternatively, a fluid, such as an oil, is circulated through the interiors of the multiple mandrels. Step 908 can include heating the wrapped mandrels within the tool 1001 for a prescribed duration in accordance with the cure requirement of the composite system. An oven can be used to generate that requisite heat, for example. Airflow can improve the heating rate and heat distribution to the composite material wrapped around each mandrel; as such, it is particularly desirable to have an interior opening through each mandrel that is sized to accommodate a prescribed amount of airflow.

Bladder 1007 can be controlled by the controller 1013 so as to tailor the amount and timing of pressure exerted at the cell walls of composite material between the mandrels within the tool 1001. For example, the bladder 1007 can be controlled by the controller 1013 to change the amount of pressure during a viscosity change of the resin in the composite material. It should be appreciated that the present disclosure contemplates other methods of providing pressure to the composite material wrapped around each mandrel during the curing process, such as mechanical pressure generating devices.

After the cure cycle is complete, a composite core is achieved as the uncured composite material around each mandrel becomes rigidly bonded to each adjacent tube. The composite core that is formed by wrapping the mandrels with unidirectional fiber slits at a prescribed angle produces a composite core that has cross-linked fibers at the cell walls. For example, multiple mandrels wrapped at a wrap angle of +45 degrees with slits having unidirectional fibers will produce a cured composite core with cell walls having two plies of fibers at 90 degrees to each other. This unique result of the method and system of the present disclosure produces a very lightweight and strong composite core.

The systems and methods disclosed herein include one or more of the following advantages. The method of the present disclosure allows for the efficient production of composite core, which can reduce the cost of the composite core. Further, wrapping mandrels with unidirectional slits provides tailorability of the composite core. Further, the method of curing composite core results in a high quality composite core.

Thus, particular implementations of the subject matter have been described. Other implementations are within the scope of the following claims.

What is claimed is:

1. A composite core comprising:
   a plurality of elongate hollow twelve-sided tubes arranged in a two-dimensional array, each hollow tube made of a composite material, each hollow twelve-sided tube comprising a cross-section comprising twelve longitudinal sides, wherein:
   a first end of a first side is connected to a first end of a second side at an internal angle within the hollow twelve-sided tube greater than 90 degrees and less than 180 degrees;
   a second end of the first side is connected to a first end of a third side at an internal angle within the hollow twelve-sided tube that is greater than 90 degrees and less than 180 degrees; and
   a second end of the third side is connected to a first end of a fourth side at an internal angle within the hollow twelve-sided tube that is greater than 180 degrees; and
   one or more hollow tubes of hexagonal cross-section, wherein two sides of each hollow tube of hexagonal cross-section are aligned with two sides of at least one hollow twelve-sided tube of the plurality of elongate hollow twelve-sided tubes.

2. The core of claim 1, wherein:
   a second end of the fourth side is connected to a first end of a fifth side at an internal angle within the hollow tube that is greater than 90 degrees and less than 180 degrees; and
   a second end of the fifth side is connected to a first end of a sixth side at an internal angle within the hollow tube is greater than 90 degrees and less than 180 degrees.

3. The core of claim 2, wherein:
   a second end of the sixth side is connected to a first end of the seventh side at an internal angle within the hollow tube that is greater than 90 degrees and less than 180 degrees; and
   a second end of the seventh side is connected to a first end of an eighth side at an internal angle within the hollow tube that is greater than 180 degrees.

4. The core of claim 3, wherein:
   a second end of the eighth side is connected to a first end of the ninth side at an internal angle within the hollow tube that is greater than 90 degrees and less than 180 degrees; and
   a second end of the ninth side is connected to a first end of a tenth side at an internal angle within the hollow tube is greater than 90 degrees and less than 180 degrees.

5. The core of claim 4, wherein:
   a second end of the tenth side is connected to a first end of an eleventh side at an internal angle within the hollow tube that is greater than 90 degrees and less than 180 degrees; and
   a second end of the eleventh side is connected to a first end of the twelfth side at an internal angle within the hollow tube that is greater than 180 degrees.

6. The core of claim 5, wherein a second end of the twelfth side is connected to a second end of the first side at an internal angle within the hollow tube is greater than 90 degrees and less than 180 degrees.

7. The core of claim 1, wherein the twelve sides are of substantially equal length.

8. The core of claim 1, wherein the cross-section of each hollow tube comprises a first set of three joints, each joint in the first set formed by a side connecting to an adjacent side at an internal angle is greater than 90 degrees and less than 180 degrees, wherein each joint in the first set protrudes outwards away from a longitudinal axis of each hollow tube.

9. The core of claim 8, wherein the cross-section of each hollow tube comprises a second set of three joints, each joint in the second set formed by a side connecting to an adjacent side at an internal angle that is greater than 180 degrees, wherein each joint in the second set protrudes inwards towards the longitudinal axis of each hollow tube.

10. The core of claim 9, wherein the plurality of tubes comprises a first tube and a second tube, wherein outer surfaces of two sides forming a joint in the first set of joints in the first tube contacts outer surfaces of two sides forming a joint in the second set of joints in the second tube.

11. The core of claim 9, wherein the plurality of tubes comprises a first tube, a second tube and a third tube, wherein a joint in the first set of joints of the first tube contacts a joint in the second set of joints of the second tube, a joint in the first set of joints of the second tube contacts a joint in the second set of joints of the third tube, and a joint in the first set of joints of the third tube contacts a joint in the second set of joints of the first tube.

12. The core of claim 1, wherein each tube comprises a plurality of reinforcement fibers disposed in a polymeric matrix.

13. The core of claim 12, wherein the reinforcement fibers comprise at least one or more of carbon, graphite, glass, an aromatic polyamide material or a variant of the aromatic polyamide material.

14. The core of claim 12, wherein the polymeric matrix comprises a resin.

15. The core of claim 14, wherein the resin is a thermoplastic resin or a thermosetting resin.

16. The core of claim 12, wherein the plurality of reinforcement fibers are oriented in one direction.

* * * * *